106-75    AU 113    EX
8/31/82   XR   4,347,326

United States Patent [19]
Iwami et al.

[11] 4,347,326
[45] Aug. 31, 1982

[54] FOAMABLE GLASS COMPOSITION AND GLASS FOAM

[75] Inventors: Isamu Iwami, Zushi; Shingo Kimura, Yokohama; Toshio Iwasa, Tokyo, all of Japan

[73] Assignee: Asahi-Dow Limited, Tokyo, Japan

[21] Appl. No.: 242,547

[22] Filed: Mar. 11, 1981

[30]   Foreign Application Priority Data

Mar. 17, 1980 [JP]  Japan ............................ 55/32654
Mar. 17, 1980 [JP]  Japan ............................ 55/32655
Dec. 3, 1980 [JP]   Japan ........................... 55/169674

[51] Int. Cl.³ ................ C03C 11/00; C03C 3/04; C03C 3/08; C03C 3/10
[52] U.S. Cl. ........................... 501/39; 106/75; 501/60; 501/61; 501/62; 501/65; 501/66; 501/67; 501/68; 501/70; 501/72
[58] Field of Search ................ 106/40 V, 52, 75, 53, 106/54; 252/62; 501/39, 72, 60, 61, 62, 65, 66, 67, 68, 70

[56]   References Cited
U.S. PATENT DOCUMENTS 2,191,658  2/1940  Haux ........................... 106/40 V
2,758,937  8/1956  Ford ............................ 106/40 V
3,663,249  5/1972  Rao ............................. 106/75
3,951,632  4/1976  Seki et al. ................... 106/40 V
4,124,365  11/1978  Williams et al. ............ 106/40 V

FOREIGN PATENT DOCUMENTS 49-12885   3/1974   Japan .
50-31170   10/1975  Japan .
54-57528   5/1979   Japan .
54-127430  10/1979  Japan .
54-152011  11/1979  Japan ............................ 106/40 V
490168     8/1938   United Kingdom ............ 106/40 V

*Primary Examiner*—Mark Bell
*Attorney, Agent, or Firm*—Armstrong, Nikaido, Marmelstein & Kubovcik

[57]   ABSTRACT

Foamable glass composition suitable for making glass foam, which starts from water glass material and consisting essentially of 100 parts by weight of anhydrous modified sodium silicate and 0.5–4 parts by weight of $CaCO_3$ as a foaming agent. A foam in the closed-cell form, which is light is in weight, and excellent water resistance, strength and heat resistance, is obtained, wherein $CO_2$ in a gas existing in the cell is 50% by volume or more.

16 Claims, No Drawings

FOAMABLE GLASS COMPOSITION AND GLASS FOAM

This invention relates to novel foamable glass compositions mainly composed of anhydrous sodium silicate, and foams obtained therefrom. It more particularly relates to foamable glass compositions made from anhydrous modified sodium silicate and calcium carbonate as foaming agent, being suited for production of light weight and excellent in water resistance, strength and heat resistance, and incombustible inorganic foams, and foams obtained from said formable glass compositions.

Of late, from the viewpoint of saving energy, there is an increasing demand for thermal insulation in general buildings and industrial facilities. Thermal insulating materials are classified into organic and inorganic types. The organic foams are widely used in building materials and various insulating materials for their excellent thermal insulating ability, but are easy to burn by nature, and generate harmful gases. Hence, from the aspect of safety, in particular, there is a heightening demand for inorganic thermal insulating materials which are in combustible and excellent in heat resistance.

Glass wool is one of the typical commercial inorganic thermal insulating materials. It is used in huge quantities in general building construction. It is light weight, and excels in thermal insulating performance in dry state, but since it is a bundle of short filaments, the glass wool has a high air permeability, and, consequently, the insulating property is lost under humid state. Yet, since it does not have shape retaining power by itself, gaps are caused in a long period of use, and special construction means is needed to prevent such problems.

Hard types of inorganic heat insulating materials include a lightweight calcium silicate insulator and glass foam, which are now actually used.

Lightweight calcium silicate insulator excels in thermal insulation in dry state, but has very high water and moisture absorption, so it cannot be used in humid places, and the range of applications is limited.

Glass foam has relatively high mechanical strength and excels in persistance of thermal insulating property, but it is very expensive and may be used only in limited fields at the present.

On the other hand, water glass (an aqueous solution of alkali metal silicate) is an inexpensive and abundant material, and it is known for long that a foam is obtained when it is heated. Various attempts have been made to produce thermal insulating materials from water glass. Since commercial alkali metal silicates are water-soluble, the obtained foams are inferior in performances relating to water resistance, such as water absorption resistance, moisture absorption resistance and moisture permeation resistance, and do not have enough thermal insulating performance to be practically used as thermal insulating materials. Yet, foams of sufficient strength are not developed yet, and they are not in usable stage.

Of these defects, as for the improvement of water resistance, many methods had been proposed so far: for example, a method to treat the produced foam with the solution of acid and metal salt (as in Published Examined Japanese Patent Application No. 12885/74), a method to foam after hydrating the anhydrous alkali metal silicate (U.S. Pat. No. 3,663,249 and UK Pat. No. 1,351,213), or a method to add a modifier for imparting water resistance to the concentrate of water glass (as in Published Unexamined Japanese Patent Application No. 57528/79). Thus, the water resistance was improved to a certain degree, but was not sufficient for practical use.

At the same time, various methods had been previously proposed for enhancement of mechanical strength: for example, a method to foam by mixing boric acid to water glass regulated of water content (as in Published Examined Japanese Patent Application No. 31170/75), and a method to add aggregate to the concentrate of water glass (as in Published Unexamined Japanese Patent Application No. 127430/79). But, so far, foams being light weight and having enough strength were not obtained.

That is, the water glass foams are advantageous in that foams of low specific gravity and low thermal conductivity are obtained relatively easily by heating and foaming the raw material of alkali metal silicate solution by utilizing the evaporation of water, but the obtained foams have poor mechanical strength (compressive strength, bending strength, impact strength), and small closed cell rate, and were not quite satisfactory in performances relating to water resistance such as resistance to water absorption, moisture absorption and moisure permeation. Hence, such foams were inferior in the thermal insulating performance and involved many difficult problems to be solved for realization in practical use.

The inventors, in this background, studied and researched to solve various conventional problems in production of foams of water glass using inexpensive alkali metal silicate as the raw material, and, as a result, have succeeded by specifying the composition of glass and the kind and quantity of foaming agents to produce glass foams which possess excellent mechanical strength not achieved in the conventional water glass foams, have a high closed cell rate, and excel in performances relating to water resistance such as water absorption resistance, moisture absorption resistance and moisture permeation resistance, and further excel in prolonged persistence of thermal insulating property, thereby attaining the present invention.

In one aspect, therefore, this invention presents a novel foamable glass composition consisting essentially of 100 parts by weight of modified sodium silicate glass and 0.5 to 4 parts by weight of $CaCO_3$ as foaming agent, wherein the composition of modified sodium silicate is $Na_2O \cdot xSiO_2$ 75 to 95 wt.% (x being 3 to 3.8), modifier CaO 5 to 15 wt.%, and modifier MO 0 to 10 wt.% (M: metal other than sodium and calcium, or boron).

In another aspect, the present invention present the foam of which cell wall is made of oxides in the composition of $SiO_2$ 54.6 to 74.5 wt.%, $Na_2O$ 15.7 to 17.2 wt.%, CaO 5.3 to 17.2 wt.%, and MO 0 to 10.0 wt.%, and wherein the content of $CO_2$ in gas components existing in the cell is not less than 50 vol.%.

The foamable glass composition of this invention is obtained by mixing 100 parts by weight of anhydrous modified sodium silicate glass powder and 0.5 to 4 parts by weight of $CaCO_3$ powder as foaming agent.

Means of mixing may include ball mill, vibrating ball mill, jet atomizer, flash mixer, and continuous type fluidized bed mixer, and from the viewpoint of uniformity of mixing, a method of applying shearing force such as ball mill and vibrating ball mill is preferable. The mixing time is about 10 minutes to 5 hours in the case of a ball mill. The smaller the glass grain size, the smaller becomes the cell of the obtained foam, and hence more uniform. The grain size is usually 150-mesh pass, or preferably 325-mesh pass. The grain size of calcium carbonate should be preferably equal to or smaller than that of the glass.

The anhydrous modified sodium silicate glass is obtained by heating and melting sodium silicate and modifiers, or by heating and melting various compounds and natural elements which produce, when melted, sodium silicate and modifiers of the equivalent composition. Means of melting may include a batch method using a crucible and a continuous method using a tank kiln. Melting is usually done for scores of minutes to scores of hours at 1100° to 1500° C. For instance, anhydrous sodium silicate powder and modifier powder such as calcium carbonate and ferric oxide are uniformly mixed to a desired composition, and heated and melted in a crucible for scores of minutes to several hours at 1200° to 1400° C., or silica sand, soda ash, and limestone or the like are mixed to a desired composition, and heated and melted for several hours to scores of hours at 1200° to 1500° C., and after cooling the glass of the present invention will be obtained.

The sodium silicate used in this invention is expressed by a general formula $Na_2O \cdot xSiO_2$, wherein x may range from 3 to 3.8. When the value of x is less than 3 or more than 3.8, the obtained foam may be low closed cell rate, being less than 40%, or poor long-term water resistance, being more than 30 vol.%, or have low water resistance while having a high closed cell rate.

The sodium silicate is obtained, for instance, by heating and melting silica sand and soda ash.

The anhydrous modified sodium silicate glass means in this invention to be anhydrous substantially, which practically means that a small amount of water may be deposited or absorbed.

The modifier used in the present invention should contain at least calcium oxide, which may be either calcium oxide alone or a combination of calcium oxide and other modifier (MO).

The modifier is added so that the content of calcium oxide in the anhydrous modified sodium silicate glass may be 5 to 15 wt.%, preferably 7 to 12 wt.%, and that of MO being 0 to 10 wt.%. If the content of calcium oxide is more than 15 wt.%, lightening of weight of the foam is difficult; if less than 5 wt.%, the water resistance of the foam becomes inferior. When the content of calcium oxide is 7 to 12 wt.%, the apparent density becomes low, being not more than 0.25 g/cm$^3$, and the closed cell rate becomes high, being not less than 60%, and the long-term water resistance is not more than 30 vol.%, so that an excellent foam may be easily obtained. The MO, when added very slightly, barely shows its effect, and its effect appears when the content is 0.5 wt.% or higher. When the MO content is higher than 10 wt.%, to the contrary, excellent foam of high closed cell rate and good water resistance is not obtained. If the total content of modifiers (CaO+MO) exceeds 25 wt.%, the foam of light weight and good water resistance is not obtained. If the total content of modifiers is less than 5 wt.%, on the other hand, the water resistance of modified sodium silicate glass itself becomes inferior, so that the water resistance of the produced foam may be also poor.

As the modifier (MO) to be used in combination with the calcium oxide, various oxides may be used, which include boron oxide, titanium oxide, tin oxide, zirconium oxide, aluminum oxide, magnesium oxide, zinc oxide, strontium oxide, lead oxide, copper oxide, iron oxide, cobalt oxide, nickel oxide, vanadium oxide, potassium oxide, and lithium oxide, but from the viewpoint of economy and effect, preferably, at least one oxide should be selected from a group of aluminum oxide, magnesium oxide, titanium oxide, zinc oxide, boron oxide, zirconium oxide, lead oxide, copper oxide, strontium oxide, iron oxide, potassium oxide, and lithium oxide.

When the MO contains at least iron oxide, the water resistance of the obtained foam becomes very excellent, so that is is relatively easy to produce the foam of which long-term water resistance is not more than 10 vol.%.

Besides the oxides listed above, the modifier includes elements which produce oxides of equivalent composition when melted, and for example, various corresponding artificial or natural hydroxides, carbonates, sulfates, borates, silicates, and other compounds, may be used.

The foaming agent used in this invention is calcium carbonate, and it is difficult to obtain an intended foam of the invention by using other foaming agent. By combining calcium carbonate with the modified sodium silicate glass of this invention, a foam of light weight, high closed cell rate, and excellent water resistance disclosed in this invention is obtained.

In any prior known technology, it had been impossible to produce a foam of high closed cell rate by using calcium carbonate as foaming agent (as mentioned in page 832 of "Glass Engineering Handbook," Asakura Shoten, Japan). For instance, as exemplified in reference example 21, when a glass disclosed in Published Unexamined Japanese Patent Application No. 123412/77 was foamed by using calcium carbonate, the closed cell rate was 15%, thus the foam of good closed cell rate could not be obtained.

The content of foaming agent is 0.5 to 4 parts by weight, as of 100 parts by weight of glass, or preferably 0.6 to 2.5 parts by weight. If the content of foaming agent is less than 0.5 part by weight, the apparent density of the obtained foam is high, being more than 0.38 g/cm$^3$, if exceeding 4 parts by weight, the cell is coarse, being more than 4 mm, and the foam has uneven cell structure and low closed cell rate. When the content of foaming agent is 0.6 to 2.5 parts by weight, an excellent foam of low density, small cell size and uniform cell structure is obtained.

Since the modified sodium silicate glass of the present invention has a mol ratio of $SiO_2/Na_2O$ ranging from 3 to 3.8, it is easy to obtain glass of relatively low melting point, and since the temperature may be low when producing glass or producing foams by using this glass, it is advantageous for the economy of energy and facility materials. Or, when the melting point is less than 700° C., more advantageously, heat-resistant metal materials may be used for the molds of foaming and for other materials.

The glass foam of this invention is obtained by heating and then cooling the foamable glass composition proposed in this invention. For example, a foamable glass composition is charged in a heat-resistant mold of stainless steel or similar material being coated with mold release agent such as clay, and is rapidly heated up to 500° to 600° C. in an electric furnace, combustion furnace, or the like, and is further heated, at a heat elevation rate of 30° to 500° C./hr up to the maximum temperature of 650° to 850° C., and kept at this maximum temperature for 5 to 150 minutes. Then it is quenched to about 550° to 600° C. in 20 to 60 minutes, and is slowly cooled linearly to room temperature in 10 to 20 hours, so that the foam of this invention may be obtained.

The foam in this invention has a cell wall consisting of oxides in the composition of $SiO_2$ 54.6 to 74.5 wt.%, $Na_2O$ 15.7 to 24.2 wt.%, CaO 5.3 to 17.2 wt.%, and MO 0 to 10.0 wt.%.

Besides, the cell contains in itself some air, gases dissolved in glass, and other gases derived from impurities. Since calcium carbonate is used as foaming agent, the $CO_2$ rate of gases existing in one cell becomes 50 vol.% or more.

The foam in this invention, since calcium carbonate is used as foaming agent, is capable of presenting beautiful colors, such as white, yellow and blue, depending on the composition of modified sodium silicate glass, namely, on the kind of MO being used, unlike the usual black color of carbon type foaming agent, so that it may be used favorably as the building material for interior and exterior furnishing. In addition, the foaming gas is $CO_2$, it is free from offensive smell or toxicity, and excels in workability.

The preferable characteristics of the foam proposed in this invention are as presented hereunder. The values of these characteristics are measured by the method shown in Example 1.

| | | |
|---|---|---|
| 1. | Apparent density | 0.1 to 0.25 g/cm$^3$ |
| 2. | Cell size | 4 mm or less |
| 3. | Closed cell rate | 40% or more |
| 4. | Thermal conductivity | 0.08 kcal/m.hr.°C. or less |
| 5. | Compressive strength | 3 kg/cm$^2$ or more |
| 6. | Water absorption | 5 vol. % or less |
| 7. | Long-term water resistance | 40 vol. % or less |

When the apparent density is less than 0.1 g/cm$^3$, the mechanical strength of foam is too small, so that the compressive strength of 3 kg/cm$^2$ or more generally required as hard type heat insulating material cannot be obtained. If the apparent density is more than 0.25 g/cm$^3$, on the other hand, the thermal conductivity of the foam becomes large, which means larger thickness is needed to obtain a heat insulating performance equivalent to that of low thermal conductivity. This is not, hence, economical. The thermal conductivity should be preferably 0.08 kcal/m.hr.°C. or less.

The cell size affects the closed cell rate and thermal conductivity; when it exceeds 4 mm, the closed cell rate becomes low and thermal conductivity high, and density distribution uneven, so that the obtained foam is utterly unusable.

When the closed cell rate is less than 40% and water absorption is more than 5 vol.%, the foam is pervious to water vapor, so that the long-term heat insulating performance becomes inferior.

When the long-term water resistance is more than 40 vol.%, the foam becomes less resistant to water, and when it is exposed to a high humidity atmosphere for a long term, it comes to be pervious to moisture.

Besides, the foam of this invention excels also in the moisture absorption resistance; when a foam measuring 25 by 25 by 30 mm is exposed to a steam at 105° C. in an autoclave for one hour, the moisture absorption of the foam is only 0.5 wt./vol.% or less.

Hereunder is described this invention in further details by means of illustration of the examples and reference examples.

EXAMPLE 1

Sodium silicate powder having a ratio of $Na_2O:SiO_2$ of 1:3.2 and calcium carbonate powder were blended so that the CaO content may be 10.0 wt.%, and mixed, and the mixture was melted at the maximum temperature of 1350° C. for about 2 hours, and quenched to produce the glass. The melting point of this glass was 690° C. and water resistance was 0.7 wt.%. The composition was $SiO_2$ 68.4, $Na_2O$ 21.9, and CaO 9.7 wt.%. The melting point referred to here means the sintering temperature of glass powder, which was determined according to the following method (the same method was applied in subsequent cases). That is 5 g of glass powder (100-mesh pass) was taken in a 30 cc porcelain crucible, and held in an electric furnace controlled at a specified temperature for 10 minutes, and the crucible was taken out of the furnace and cooled, and the melting point was judged visually. The temperature where sintering was complete and white scattering due to the boundary of particles was not recognized was taken as the melting point. The water resistance of glass was measured according to the following method (the same method was applied in subsequent cases). That is, glass powder of which grain size was arranged within 14 to 25 mesh was weighed exactly 1.5 g, and put in a 300 cc Erlenmeyer flask together with 150 cc heated distilled water, and was heated for 4 hours by slowly agitating with a magnetic stirrer while refluxing on a water bath. After removing fine suspended matter by decantation, the glass sample was filtered by a 1G1 glass filter, and the decreased weight of the glass was determined by weighing the sample before and after heating, and the water resistance was expressed in percentage with respect to the weight before heating. In this case, the weight of the glass was measured after drying at 150° C. for an hour, and letting stand to cool in a desiccator.

Then, this glass was crushed to powder of 325-mesh pass by using a ball mill, and 1 part by weight of calcium carbonate powder of reagent grade of 400-mesh pass was added to 100 parts by weight of this glass powder, and mixed in the ball mill for an hour, and a foamable glass composition was produced.

A proper amount of this glass composition was charged in a stainless steel mold, and the mold is put in an electric furnace controlled at 500° C. to be preheated for 30 minutes, and was further heated to 710° C. at temperature elevation rate of 400° C./hr, and held at this temperature for 120 minutes. Then, after slowly cooling, a glass foam was obtained.

Test pieces for measurements of physical properties were cut out from the obtained foam, and the apparent density, cell size, closed cell rate, thermal conductivity, compressive strength, water absorption rate, water absorption by long-term water resistance accelerated test (hereinafter abbreviated as long-term water resistance), and $CO_2$ concentration in the cell were measured. The obtained physical properties are shown in Table 1. The obtained foam had a white color, of which apparent density was 0.17 g/cm$^3$, cell size 1 mm$\phi$, closed cell rate 73%, thermal conductivity 0.048 kcal/m.hr.°C., compressive strength 14 kg/cm$^2$, moisture absorption rate 3.1 vol.%, and water resistance 20 vol.%. Thus, the foam was found to have excellent properties as thermal insulating material. The $CO_2$ concentration in cell was 80 vol.%.

The physical properties were determined in the following methods (the same methods were applied in subsequent cases).

Apparent density: The weight of foam measuring 5 by 5 by 5 cm was divided by the volume.

Cell size: The diameter of 30 cells each in two cross sections of sample was measured by using a universal projector, and the average was taken as the cell size.

Closed cell rate: BECKMAN Air Picknometer was used. The size of sample was 25 by 25 by 30 mm.

Thermal conductivity: It was measured in accordance with ASTM C518. The temperature was 35° C.

Compressive strength: The procedure abided by ASTM C240 except that the sample size was 5 by 5 by 5 cm.

Moisture absorption rate: The procedure abided by ASTM C240, except that the sample size was 5 by 5 by 5 cm. Long-term water reistance: The sample was dipped in hot water at 70° C. for 40 hours, and the weight after dipping was measured according to the procedure in ATSM C240, and the water absorption was calculated. The size of sample was 25 by 25 by 30 mm.

$CO_2$ concentration: Three foams measuring 25 by 25 by 30 mm were put in a 500 ml stainless steel container for vacuum service equipped with a crushing rod, and the container was evacuated to 10 mmHg, and the foams were crushed under reduced pressure. Then, water adjusted to pH 4.0 with hydrochloric acid was put in the container, and the pressure was raised to normal pressure, and the gases in the foams were captured in a gas sump provided in the upper part of the container. The $CO_2$ concentration was determined by the gas chromatography, using the calibration curve.

| Conditions: | |
| --- | --- |
| Amount of sample | 0.5 ml |
| Column | Silica gel |
| Temperature | 100° C. |
| Carrier gas | Argon |
| Detector | TCD |

EXAMPLES 2 and 3

Using the same glass composition as in Example 1, the foams were prepared in the same procedure as in Example 1, except that the maximum temperature and holding time were 730° C. and 30 minutes in Example 2, and 770° C. and 50 minutes respectively in Example 3. The physical properties of the foams are shown in Table 1. This table suggests that the degree of freedom may be considerably wide with respect to the temperature and holding time.

TABLE 1

| | Apparent density (g/cm³) | Closed cell rate (%) | Thermal conductivity (kcal/m.hr.°C.) | Compressive strength (kg/cm²) | Long-term water resistance (vol. %) |
| --- | --- | --- | --- | --- | --- |
| Example 1 | 0.17 | 73 | 0.048 | 14 | 20 |
| Example 2 | 0.17 | 70 | 0.048 | 15 | 25 |
| Example 3 | 0.13 | 67 | 0.043 | 6 | 18 |

EXAMPLES 4, 5 AND 6, REFERENCE EXAMPLE 1

The same glass as in Example 1 was used. The amount of foaming agent was 1.0 part by weight in Example 4, 0.7 in Example 5, 0.6 in Example 6, and 0.3 in Reference Example 1, and the temperature elevation rate was 100° C./hr, and the maximum temperature and holding time were 750° C. and 50 minutes. Other conditions was the same as in Example 1, and the foams were prepared accordingly. The effects of the amount of foaming agent on the properties of foams are shown in Table 2.

TABLE 2

| | Apparent density (g/cm³) | Thermal conductivity (kcal/m.hr.°C.) |
| --- | --- | --- |
| Example 4 | 0.17 | 0.047 |
| Example 5 | 0.21 | 0.056 |
| Example 6 | 0.23 | 0.060 |
| Reference Example 1 | 0.43 | 0.093 |

EXAMPLES 7 TO 9, REFERENCE EXAMPLES 2 AND 3

The glasses having the composition listed in Table 3 were prepared by using sodium silicate powder having a ratio of $Na_2O:SiO_2$ of 1:3.3 by the same method as in Example 1. Table 3 shows glass composition, compound used as modifier, mol ratio of $SiO_2/Na_2O$ of glass (S/N ratio), melting point, and long-term water resistance, at the same time. In this case, the S/N ratio was adjusted by using $SiO_2$. The maximum temperature and holding time were 730° C. and 30 minutes in Examples 7 to 9, 780° C. and 30 minutes in Reference Example 2, and 690° C. and 20 minutes in Reference Example 3, and the temperature elevation rate was 200° C./hr. Other conditions was the same as in Example 1. Thus foams were prepared. The effects of CaO content on the properties of foams are shown in Table 4.

TABLE 3

| | Glass composition (wt. %) | | | | Modifier compound | S/N ratio | Melting point (°C.) | Water resistance (wt. %) |
| --- | --- | --- | --- | --- | --- | --- | --- | --- |
| | $SiO_2$ | $Na_2O$ | Modifier | | | | | |
| Example 7 | 70.7 | 22.6 | CaO | 7.3 | $CaCO_3$ | 3.3 | 690 | 0.9 |
| Example 8 | 66.9 | 21.6 | CaO | 11.5 | " | 3.3 | 700 | 0.4 |
| Example 9 | 67.1 | 20.4 | CaO | 12.5 | " | 3.4 | 710 | 0.4 |
| Reference Example 2 | 62.0 | 20.0 | CaO | 18.0 | " | 3.3 | 760 | 1.2 |
| Reference Example 3 | 72.3 | 23.2 | CaO $Al_2O_3$ | 3.0 1.5 | $CaCO_3/$ $Al_2O_3$ | 3.3 | 640 | 3.6 |

TABLE 4

|  | Apparent density (g/cm³) | Closed cell rate (%) | Thermal conductivity (kcal/m.hr.°C.) | Compressive strength (kg/cm²) | Water absorption rate (vol. %) | Long-term water resistance (vol. %) |
| --- | --- | --- | --- | --- | --- | --- |
| Example 7 | 0.17 | 59 | 0.045 | 15 | 3.1 | 30 |
| Example 8 | 0.17 | 70 | 0.046 | 15 | 3.0 | 20 |
| Example 9 | 0.18 | 56 | 0.048 | 17 | 3.0 | 36 |
| Reference Example 2 | 0.45 | — | 0.095 | — | 2.3 | — |
| Reference Example 3 | 0.16 | 60 | 0.045 | 10 | 4.1 | 65 |

EXAMPLES 10 TO 14, REFERENCE EXAMPLES 4 TO 7

The glasses having the composition listed in Table 5 were prepared in the same manner as in Example 1, except that the melting temperature and time were respectively 1400° C. and 3 hours. The foams were prepared in the same manner as in Example 1, except that the content of the foaming agent was 0.9 part by weight in Examples 10 and 11 and Reference Examples 4 to 6, and 0.85 in Examples 12 and 14, and 0.7 in Example 13, and the maximum temperature and holding time were 850° C. and 20 minutes in Reference Example 6, and 730° C. and 30 minutes in other Examples. The properties of foams with the kind and quantity of modifier varied are shown in Table 6.

TABLE 5

|  | Glass composition (wt. %) | | | | Modifier compound | S/N ratio | Melting point (°C.) | Water resistance (wt. %) |
| --- | --- | --- | --- | --- | --- | --- | --- | --- |
|  | SiO₂ | Na₂O | Modifier | | | | | |
| Example 10 | 66.8 | 21.4 | CaO Al₂O₃ | 9.8 2.0 | CaCO₃/Al₂O₃ | 3.2 | 690 | 0.6 |
| Example 11 | 65.5 | 21.0 | CaO TiO₂ | 9.6 3.9 | CaCO₃/TiO₂ | 3.2 | 680 | 0.6 |
| Example 12 | 66.8 | 21.4 | CaO ZrO₂ | 9.8 2.0 | CaCO₃/ZrO₂ | 3.2 | 690 | 0.3 |
| Example 13 | 68.1 | 21.9 | CaO MgO | 8.0 2.0 | CaCO₃/MgO | 3.2 | 680 | 0.6 |
| Example 14 | 66.9 | 21.5 | CaO PbO | 10.0 2.0 | CaCO₃/PbO | 3.2 | 670 | 0.7 |
| Reference Example 4 | 70.1 | 22.6 | MgO | 7.3 | MgO | 3.2 | 690 | 0.5 |
| Reference Example 5 | 70.1 | 22.6 | Al₂O₃ CaO | 7.3 8.0 | Al₂O₃ | 3.2 | 710 | 0.4 |
| Reference Example 6 | 54.5 | 17.5 | Al₂O₃ CaO | 12.0 13.0 | CaCO₃/Al₂O₃ | 3.2 | 760 | 0.4 |
| Reference Example 7 | 55.1 | 17.9 | Al₂O₃ MgO | 12.0 2.0 | CaCO₃/Al₂O₃/ MgO | 3.2 | 790 | 0.3 |

TABLE 6

|  | Apparent density (g/cm³) | Closed cell rate (%) | Long-term water resistance (vol. %) |
| --- | --- | --- | --- |
| Example 10 | 0.17 | 65 | 20 |
| Example 11 | 0.16 | 64 | 21 |
| Example 12 | 0.17 | 65 | 17 |
| Example 13 | 0.22 | 75 | 22 |
| Example 14 | 0.16 | 68 | 20 |
| Reference Example 4 | 0.20 | 75 | 62 |
| Reference Example 5 | 0.20 | 15 | 55 |
| Reference Example 6 | 0.21 | 25 | 45 |
| Reference Example 7 | 0.62 | — | — |

EXAMPLES 15 TO 20, REFERENCE EXAMPLES 8 TO 10

The glasses having the composition listed in Table 7 were prepared in the same manner as in Example 7. The foams were prepared in the same manner as in Example 7, except that the content of the foaming agent was 0.8 part by weight in Examples 15 and 17, 2.0 in Example 19, and 1.0 in other Examples and Reference Examples, and the temperature elevation rate 200° C./hr, and the maximum temperature and holding time 780° C. and 20 minutes in Reference Example 10, and 780° C. and 30 minutes in other Examples. The properties of foams with the kind and quantity of modifier varied are shown in Table 8.

TABLE 7

|  | Glass composition (wt. %) | | | | Modifier compound | S/N ratio | Melting point (°C.) | Water resistance (wt. %) |
| --- | --- | --- | --- | --- | --- | --- | --- | --- |
|  | SiO₂ | Na₂O | Modifier | | | | | |
| Example 15 | 67.2 | 21.0 | CaO ZnO | 9.8 2.0 | CaCO₃/ZnO | 3.3 | 670 | 0.5 |
| Example 16 | 66.6 | 20.9 | CaO ZnO | 5.6 6.9 | CaCO₃/ZnO | 3.3 | 690 | 0.4 |
| Example 17 | 65.5 | 20.5 | CaO | 12.0 | CaCO₃/B₂O₂ | 3.3 | 680 | 0.6 |

TABLE 7-continued

| | Glass composition (wt. %) | | | Modifier compound | S/N ratio | Melting point (°C.) | Water resistance (wt. %) |
|---|---|---|---|---|---|---|---|
| | SiO$_2$ | Na$_2$O | Modifier | | | | |
| Example 18 | 66.6 | 20.9 | B$_2$O$_3$ 2.0<br>CaO 5.6<br>B$_2$O$_3$ 6.9 | CaCO$_3$/B$_2$O$_2$ | 3.3 | 690 | 0.8 |
| Example 19 | 65.1 | 20.4 | CaO 6.0<br>TiO$_2$ 4.5<br>Al$_2$O$_3$ 4.0 | CaCO$_3$/TiO$_2$/Al$_2$O | 3.3 | 690 | 0.5 |
| Example 20 | 67.8 | 20.2 | CaO 8.0<br>K$_2$O 2.0<br>SrO 1.0 | CaCO$_3$/K$_2$CO$_3$/SrCO$_3$ | 3.3 | 660 | 0.8 |
| Reference Example 8 | 70.1 | 22.6 | ZnO 7.3 | ZnO | 3.3 | 670 | 0.4 |
| Reference Example 9 | 70.1 | 22.6 | B$_2$O$_3$ 7.3 | B$_2$O$_3$ | 3.3 | 670 | 0.7 |
| Reference Example 10 | 65.5 | 20.5 | MgO 10.0<br>Al$_2$O$_3$ 4.0 | MgO/Al$_2$O$_3$ | 3.3 | 730 | 0.4 |

TABLE 8

| | Apparent density (g/cm$^3$) | Closed cell rate (%) | Long term water resistance (vol. %) |
|---|---|---|---|
| Example 15 | 0.18 | 65 | 20 |
| Example 16 | 0.18 | 60 | 37 |
| Example 17 | 0.18 | 67 | 25 |
| Example 18 | 0.18 | 62 | 35 |
| Example 19 | 0.19 | 57 | 33 |
| Example 20 | 0.16 | 68 | 18 |
| Reference Example 8 | 0.16 | 53 | 60 |
| Reference Example 9 | 0.16 | 62 | 63 |
| Reference Example 10 | 0.18 | 25 | 53 |

EXAMPLES 21 TO 24, REFERENCE EXAMPLE 11

The glasses having the composition listed in Table 9 were prepared in the same manner as in Example 1. The foams were prepared in the same conditions as in Example 1, except that the content of foaming agent was 1.0 part by weight in Example 21, 0.8 in Example 22, and 0.9 in other Examples, and the maximum temperature and holding time 800° C. and 20 minutes in Example 24 and 760° C. and 30 minutes in other Examples. The obtained foams presented a green color in Example 24, and a beautiful yellow color in other Examples. The properties of the foams containing Fe$_2$O$_3$ as MO in the glass are shown in Table 10.

TABLE 9

| | Glass composition (wt. %) | | | Modifier compound | S/N ratio | Melting point (°C.) | Water resistance (wt. %) |
|---|---|---|---|---|---|---|---|
| | SiO$_2$ | Na$_2$O | Modifier | | | | |
| Example 21 | 66.0 | 21.2 | CaO 10.8<br>Fe$_2$O$_3$ 2.0 | CaCO$_3$/Fe$_2$O$_3$ | 3.2 | 690 | 0.9 |
| Example 22 | 66.2 | 21.2 | CaO 8.7<br>Fe$_2$O$_3$ 3.9 | CaCO$_3$/Fe$_2$O$_3$ | 3.2 | 680 | 0.4 |
| Example 23 | 65.9 | 21.1 | CaO 8.0<br>Fe$_2$O$_3$ 5.0 | CaCO$_3$/Fe$_2$O$_3$ | 3.2 | 670 | 0.5 |
| Example 24 | 66.3 | 21.2 | CaO 8.7<br>CuO 2.0<br>Fe$_2$O$_3$ 2.0 | CaCO$_3$/CuO/Fe$_2$O$_3$ | 3.2 | 680 | 0.4 |
| Reference Example 11 | 68.0 | 22.0 | CaO 3.0<br>Fe$_2$O$_3$ 7.0 | CaCO$_3$/Fe$_2$O$_3$ | 3.2 | 670 | 0.7 |

TABLE 10

| | Apparent density (g/cm$^3$) | Closed cell rate (%) | Thermal conductivity (kcal/m.hr.°C.) | Long-term water resistance (vol. %) |
|---|---|---|---|---|
| Example 21 | 0.14 | 70 | 0.043 | 7 |
| Example 22 | 0.19 | 70 | 0.049 | 8 |
| Example 23 | 0.17 | 63 | 0.048 | 20 |
| Example 24 | 0.16 | 65 | 0.045 | 15 |
| Reference Example 11 | 0.18 | 44 | 0.050 | 55 |

EXAMPLES 25 TO 27

The same glass as in Example 22 was used. The content of foaming agent was 1.1 parts by weight in Example 25, and 1.0 in Examples 26 and 27, and the maximum temperature and holding time were 780° C. and 20 minutes in Example 25, 750° C. and 30 minutes in Example 26, and 730° C. and 60 minutes in Example 27, and the temperature elevation rate was 100° C./hr in all three Examples. Other conditions were same as in Example 1. The physical properties are shown in Table 11.

TABLE 11

| | Apparent density (g/cm$^3$) | Closed cell rate (%) | Compressive strength (kg/cm$^2$) | Long-term water resistance (vol. %) |
|---|---|---|---|---|
| Example 25 | 0.13 | 63 | 6 | 8 |
| Example 26 | 0.17 | 69 | 18 | 8 |
| Example 27 | 0.17 | 70 | 17 | 14 |

EXAMPLE 28, REFERENCE EXAMPLES 12 TO 14

The glasses having the composition listed in Table 12 were prepared in the same manner as in Example 1. The S/N ratio was adjusted by using $SiO_2$ and $Na_2CO_3$. The content of foaming agent was 0.8 part by weight in Example 28, 1.0 in Reference Examples 13 and 14, and 0.9 in Reference Example 12, and the maximum temperature and holding time were 760° C. and 30 minutes in Example 28 and Reference Example 13, 720° C. and 40 minutes in Reference Examples 12, and 730° C. and 60 minutes in Reference Example 14, and the temperature elevation rate was 200° C./hr in all Examples, under which conditions the foams were produced. The effects of S/N ratio on the physical properties of the foams are shown in Table 13.

TABLE 12

| | Glass composition (wt. %) | | | Modifier compound | S/N ratio | Melting point (°C.) | Water resistance (wt. %) |
|---|---|---|---|---|---|---|---|
| | $SiO_2$ | $Na_2O$ | Modifier | | | | |
| Example 28 | 69.3 | 19.8 | CaO 10.0 $Fe_2O_3$ 1.0 | $CaCO_3$/$Fe_2O_3$ | 3.6 | 700 | 0.4 |
| Reference Example 12 | 65.0 | 26.0 | CaO 9.8 | $CaCO_3$ | 2.6 | 660 | 1.5 |
| Reference Example 13 | 74.7 | 18.8 | CaO 6.5 | $CaCO_3$ | 4.1 | 690 | 0.8 |
| Reference Example 14 | 72.5 | 19.0 | CaO 8.5 | $CaCO_3$ | 3.9 | 700 | 0.4 |

TABLE 13

| | Apparent density (g/cm³) | Closed cell rate (%) | Long-term water resistance (vol. %) |
|---|---|---|---|
| Example 28 | 0.19 | 68 | 23 |
| Reference Example 12 | 0.17 | 50 | 61 |
| Reference Example 13 | 0.19 | 20 | 52 |
| Reference Example 14 | 0.18 | 72 | 73 |

EXAMPLES 29 AND 30, REFERENCE EXAMPLE 15

Glass of $SiO_2$/$Na_2O$ mol ratio 3.2 and CaO 8.0 wt.% was prepared in the same manner as in Example 1. The melting point of glass was 690° C. and the water resistance was 0.8 wt.%. Glass powder of 200-mesh pass containing foaming agent by 2.2 parts by weight in Example 29, 3.5 in Example 30 and 4.5 in Reference Example 15 was mixed in a vibrating ball mill for about two hours. The foams were prepared under the same conditions as in Example 1, except that the maximum temperature and holding time were 740° C. and 20 minutes. The physical properties with the content of foaming agent varied are shown in Table 14.

TABLE 14

| | Apparent density (g/cm³) | Cell size (mm) | Closed cell rate (%) | Thermal conductivity (kcal/m.hr.°C.) |
|---|---|---|---|---|
| Example 29 | 0.19 | 2.0 | 55 | 0.051 |
| Example 30 | 0.23 | 2.5 | 49 | 0.063 |
| Reference Example 15 | 0.28 | 4.5 | 30 | 0.097 |

REFERENCE EXAMPLES 16 TO 18

The same glass as in Example 22 was used. As the foaming agent was used dolomite of 3.0 parts by weight in Reference Example 16, strontium carbonate of 3.0 parts by weight in Reference Example 17, and active carbon of 0.8 parts by weight and ferric oxide of 3.0 parts by weight in Reference Example 18. The maximum temperature and holding time were 770° C. and 30 minutes, and the temperature elevation rate was 200° C./hr. The foams were prepared under these conditions. The foam of Reference Example 18 presented a black color and had a poor appearance. The relation between the kind of foaming agent and physical properties of the foams is shown in Table 15.

TABLE 15

| | Apparent density (g/cm³) | Cell size (mm) | Closed cell rate (%) | Long-term water resistance (vol. %) |
|---|---|---|---|---|
| Reference Example 16 | 0.20 | 3.0 | 53 | 45 |
| Reference Example 17 | 0.40 | — | — | — |
| Reference Example 18 | 0.22 | 2.5 | 65 | 20 |

REFERENCE EXAMPLE 19

While agitating 260 parts by weight of aqueous solution of water glass ($Na_2O.3.3SiO_2$, solid content 38.5%) at 90° C., boric acid of 13 parts by weight was added and the mixture was allowed to react for about three hours, and the modified water glass was put in a mold and heated at 450° C. for 120 minutes to be foamed.

The obtained foam was white color, and had apparent density of 0.13 g/cm³, cell size 0.2 mm, closed cell rate 28%, thermal conductivity 0.043 kcal/m.hr.°C., compressive strength 2.8 kg/cm², and water absorption 10 vol.%. The $CO_2$ concentration in the cell was less than 10%.

REFERENCE EXAMPLE 20

Calcium hydroxide, 13 parts by weight, was added to 260 parts by weight of the solution of water glass No. 3 as used in Reference Example 19, and the mixture was allowed to react for about five hours while agitating at 95° C. The mixture was then dried at 150° to 200° C. until the water content was reduced to 10%, and it was crushed to powder of 10-mesh pass, charged in a mold, put it into an electric furnace controlled at 500° C., and was immediately heated to 750° C. at elevation rate of 400° C./hr. At this temperature it was held for 10 minutes. The obtained foam possessed many voids measuring 5 to 15 mm in diameter.

REFERENCE EXAMPLE 21

Using flat glass of 100 parts by weight and calcium carbonate foaming agent of 1.2 parts by weight, a foam was prepared under the same manner as in Example 1, except that the maximum temperature and holding time were 800° C. and 10 minutes. The obtained foam possessed an apparent density of 0.17 g/cm$^3$, cell size 0.3 mm, closed cell rate 15%, compressive strength 17 kg/cm$^2$, and water absorption 25 vol.%. The composition of the glass used in this Example was as follows: $SiO_2$ 72.0 wt.%, $Na_2O$ 13.0 wt.%, $K_2O$ 1.0 wt.%, CaO 7.2 wt.%, MgO 4.5 wt.%, $Al_2O_3$ 3.0 wt.%, and $Fe_2O_3$ 0.3 wt.%.

EXAMPLE 31

Modified sodium silicate glass was made from natural products.

Silica sand, limestone, and soda ash were blended by specified ratio, and the mixture was melted at 1400° C. for 10 hours to transform into glass.

The chemical composition of silica sand, limestone and soda ash, and the composition of the obtained glass are shown in Table 16.

A foam was made from the glass in the same manner as in Example 2. The foam possessed an apparent density of 0.18 g/cm$^3$, cell size 1.0 mm, closed cell rate 68%, thermal conductivity 0.049 kcal/m.hr.°C., compressive strength 22 kg/cm$^2$, water absorption 3.0 vol.%, and long-term water resistance 23 vol.%.

TABLE 16

| Composition (wt. %) | $SiO_2$ | $Na_2O$ | CaO | MgO | $Al_2O_3$ | $Fe_2O_3$ | $TiO_2$ | Ig. loss |
|---|---|---|---|---|---|---|---|---|
| Silica sand | 97.1 | — | 0.02 | 0.02 | 1.2 | 0.1 | 0.6 | 0.9 |
| Limestone | 0.12 | — | 53.2 | 2.00 | 0.12 | 0.02 | — | 43.7 |
| Soda ash | — | 57.9 | — | — | — | — | — | 42.1 |
| Synthetic glass | 67.5 | 21.5 | 9.8 | 0.4 | 0.8 | 0.1 | 0.5 | — |

EXAMPLE 32

Using petalite and the same silica sand, limestone and soda ash as in Example 31, a glass was prepared. The composition of petalite and that of the glass are shown in Table 17. The melting point of the glass was 670° C., and water resistance was 0.4 wt.%. A foam was prepared under the conditions that the content of calcium carbonate foaming agent was 0.9 part by weight, and the maximum temperature 710° C., holding time 30 minutes, and temperature elevation rate 200° C./hr. The obtained foam possessed an apparent density of 0.18 g/cm$^3$, cell size 1.0 mm, closed cell rate 66%, and long-term water resistance 20 vol.%.

TABLE 17

| Composition (wt. %) | $SiO_2$ | $Na_2O$ | $Li_2O$ | CaO | MgO | $Al_2O_3$ | $Fe_2O_3$ | $TiO_2$ |
|---|---|---|---|---|---|---|---|---|
| Petalite | 76.36 | 0.16 | 4.31 | 0.21 | 0.24 | 17.21 | 0.18 | — |
| Synthetic glass | 65.5 | 20.8 | 1.0 | 9.1 | 0.1 | 3.94 | — | 0.3 |

EXAMPLE 33

Using rouge and the same silica sand, limestone and soda ash as in Example 31, a glass was prepared. The composition of rouge and that of the glass are shown in Table 18. The melting point of the glass was 690° C., and the water resistance was 0.3 wt.%. The same procedure as of Example 22 was applied to prepare a foam.

The obtained foam possessed an apparent density of 0.17 g/cm$^3$, cell size 1.0 mm, closed cell rate 68%, compressive strength 15 kg/cm$^2$, and long-term water resistance 10 vol.%.

TABLE 18

| Composition (wt. %) | $SiO_2$ | $Na_2O$ | CaO | MgO | $Al_2O_3$ | $Fe_2O_3$ | $TiO_2$ |
|---|---|---|---|---|---|---|---|
| Rouge | 2.41 | — | — | — | 0.3 | 95.8 | — |
| Synthetic glass | 65.6 | 19.6 | 9.1 | 0.4 | 0.8 | 4.2 | 0.4 |

We claim:

1. A foamable glass composition consisting essentially of 100 parts by weight of anhydrous modified sodium silicate glass and 0.5 to 4 parts by weight of calcium carbonate ($CaCO_3$) as foaming agent, wherein the composition of anhydrous modified sodium silicate glass is

| $Na_2O.xSiO_2$ (x = 3 to 3.8) | 75 to 95 wt. % |
|---|---|
| Modifier CaO | 5 to 15 wt. % |
| Modifier MO | 0 to 10 wt. % |

(M: boron or metal other than sodium and calcium).

2. A foamable glass composition as claimed in claim 1, wherein the content of modifier CaO is 7 to 12 wt.%.

3. A foamable glass composition as claimed in claim 1, wherein the modifier MO is at least one selected from magnesium oxide, aluminum oxide, iron oxide, copper oxide, zinc oxide, boron oxide, zirconium oxide, strontium oxide, lead oxide, potassium oxide, and lithium oxide.

4. A foamable glass composition as claimed in claim 3, wherein the modifier MO contains at least iron oxide.

5. A foamable glass composition as claimed in claim 1, wherein the content of $CaCO_3$ as foaming agent is 0.6 to 2.5 wt.%.

6. A foamable glass composition as claimed in claim 1, wherein the melting point of anhydrous modified sodium silicate glass is not more than 700° C.

7. A foam produced by foaming the foamable glass composition of claim 1 of which cell wall is made of oxides in the composition as designated below, and wherein the content of $CO_2$ in the gas components existing in the cell is not less than 50 vol.%

$54.6 \leq SiO_2 \leq 74.5\%$ $15.7 \leq Na_2O \leq 24.2\%$ $5.3 \leq CaO \leq 17.2\%$ $0 \leq MO \leq 10.0\%$ (M: boron or metal other than sodium and calcium).

8. A foam as claimed in claim 7, wherein MO is at least one selected from magnesium oxide, aluminum oxide, iron oxide, copper oxide, boron oxide, zirconium oxide, strontium oxide, lead oxide, potassium oxide, and lithium oxide.

9. A foam as claimed in claim 7, wherein MO contains at least iron oxide.

10. A foam as claimed in claim 7, wherein the apparent density is 0.1 to 0.25 $g/cm^3$.

11. A foam as claimed in claim 7, wherein the cell size is not more than 4 mm.

12. A foam as claimed in claim 7, wherein the closed cell rate is not less than 40%.

13. A foam as claimed in claim 7, wherein the thermal conductivity is not more than 0.08 kcal/m.hr.°C.

14. A foam as claimed in claim 7, wherein the compressive strength is not less than 3 $kg/cm^2$.

15. A foam as claimed in claim 7, wherein the water absorption is not more than 5 vol.%.

16. A foam as claimed in claim 7, wherein the long-term water resistance is not more than 40 vol.%.

* * * * *